Patented June 3, 1947

2,421,391

UNITED STATES PATENT OFFICE 2,421,391

PROCESS FOR DENITRATING NITRO-
CELLULOSE ARTICLES

Frank H. Reichel and Ralph T. K. Cornwell, Fredericksburg, Va., assignors, by mesne assignments, to American Viscose Corporation, Wilmington, Del., a corporation of Delaware No Drawing. Application November 3, 1942,
Serial No. 464,392

7 Claims. (Cl. 18—48)

The invention relates in general to the manufacture of products from nitrocellulose and, in particular, to a process for the denitration of nitrocellulose products.

Heretofore, it has been customary in the manufacture of nitrocellulose products, such as filaments, films, tubing, and the like to carry out the denitration discontinuously as in the batch. Despite attempts to circulate the treating solution, the cellulose is frequently degraded and the product thus weakened. Moreover, the cellulose is degraded quickly by the action of sodium hydroxide which is produced from the sodium hydrosulfide usually used as the denitrating agent.

For example, it is known that when an aqueous solution of sodium hydrosulfide is exposed to the air, the solution gradually becomes more alkaline as a result of the evaporation of the hydrogen sulfide which is produced by hydrolysis. It has been found that when the denitrated product is allowed to remain in contact with the highly alkaline solution thus produced, the cellulose hydrate is invariably degraded and, when the alkali is concentrated enough, the cellulose degradation products may even be completely dissolved.

Therefore, it is the general object of the present invention to provide a process for denitrating nitrocellulose in batch or continuous manner without degrading the cellulose hydrate produced by the denitration.

It is a general object of the invention to carry out the denitration of elongate articles of nitrocellulose in a rapid and continuous manner whereby to reduce costs and expedite the manufacture of such articles.

It is a specific object of the invention to effect the denitration of nitrocellulose in such a manner as to produce a uniform product.

Other objects of the invention will in part be obvious and will in part appear hereinafter.

According to the present invention, the disadvantages of the prior practice can be avoided and products having improved properties and characteristics can be obtained by forming products from nitrocellulose and denitrating the product with an aqueous solution of an alkaline reducing agent, more particularly, an aqueous solution of an alkali hydrosulfide or (sulfhydrate) while maintaining the pH of the solution below 12 during the denitration and while the product is in contact with the denitrating solution.

It has now been found that when the pH of the aqueous solution of the alkaline reducing agent rises above a critical value of 12, the cellulose hydrate produced by the denitration is degraded so that the product is weakened or even dissolved depending upon the amount of excess alkali and the process is very difficult to control. However, it has now been found that when the pH of the solution is maintained below 12 that the denitration may be carried out in batch or in a continuous manner over a wide range of conditions, and the cellulose hydrate is not degraded, but in contrast there is produced a product which is transparent, and uniformly strong.

The invention accordingly comprises the several steps and the relation of one or more of such steps with respect to each of the others thereof, which will be exemplified in the process hereinafter disclosed, and the scope of the invention will be indicated in the claims.

The process of the invention is applicable for the denitration of the various elongate products made from nitrocellulose such, for example, as filaments, film, bands, tubing, casings, coatings; and yarn thread, fabrics, etc., made of or containing nitrocellulose filaments. The term "filaments" is intended to include artificial horsehair and artificial silk either in the form of continuous filaments or cut staple fibre. The expression "films" is intended to include photographic and motion picture films. The expression "casings" covers seamless tubing adapted for use in the packaging of sausage, food paste, ice cream, candles, grease, and for covering and packing various objects.

For the reducing agent there may be employed any suitable water-soluble alkali hydrosulfide such, for example, as calcium, sodium, potassium, or ammonium hydrosulfide and hydrosulfides of amines. With respect to the denitrating solution, other reducing substances known in the art such as ferrous chloride, stannous chloride, formaldehyde, etc. may be substituted for part or all of the alkali-hydrosulfide, the dispersion medium being water or a mixture of water and a swelling agent of the nitrocellulose such, for example, as ethyl alcohol, diethylene glycol, and the like.

Generally speaking, when alkali hydrosulfide (sulfhydrate) is used as the reducing agent the nitrogen groups of the nitrocellulose are reduced with a production of cellulose hydrate and such by-products as free sulphur and alkali polysulfide.

Instead of employing a high concentration of the reducing agent as in the practice heretofore, the present invention preferably maintains the concentration of the reducing agent at a relatively low concentration such, for example, as from 1.5% to 5% depending upon the temperature. The temperature at which the reducing treatment is carried out may be varied within a wide range, depending upon the mass of the product being treated, the concentration of the reducing agent, and the time of contact with the reducing solution. In the now preferred embodiment, the temperature employed is not substantially greater than 20° C., preferably from 10° to 15° C.

To maintain the pH of the reducing solution to a value below 12, there is employed in the present invention a buffering agent. For the buffering agent, there may be employed any water-soluble salt or acid-salt of a weak base with a strong acid or there is used any water-soluble inorganic or organic acid, which will neutralize the alkali produced during the denitration reaction. For the salts of weak bases and strong acids, there may be used, for example, salts of ammonia and amines with strong inorganic acids or strong organic acids such, for example, as sulfuric acid, hydrochloric acid, nitric acid; formic acid, oxalic acid, or lactic acid. When an acid is employed as a buffering agent, it may be any water-soluble inorganic or organic acid such, for example, as the acids just enumerated. In the preferred practice of the invention, the buffering agent is ammonium sulfate or sulfuric acid. The buffering agent may be added intermittently or continuously, preferably in the form of a dilute aqueous solution to insure rapid and uniform mixing with the denitrating bath.

In the now preferred embodiment of the process, the nitrocellulose products are passed continuously into contact with a reducing agent in solution in such a manner that the products are not subjected to any substantial degree of stretching or tension during denitration. For example, where the products are in the form of elongate bodies such, for example, as continuous filaments, films, bands, tubes, casings and the like, the products may be passed through a vessel provided with a plurality of rollers adapted to cause the products to travel in a sinuous path, the rollers being suitably driven so as to avoid subjecting the product to substantial tension or stretching. Alternatively, the product may be carried through the treating bath while supported on a suitable rack which causes the product to be festooned. The elongate articles may be caused to float on the surface of a moving bath contained in a long shallow trough. Preferably the flow of the reducing solution is concurrent with the flow of the materials through the long trough so that the solution tends to move the product forward.

The denitration of the nitrocellulose is preferably carried out while the product is in a swollen gel state by reason of containing a substantial quantity of a suitable swelling agent for the nitrocellulose as described and claimed in U. S. 2,289,520.

It is to be understood that the denitration is carried out while the product is swollen and in the gel state and, even if the product has been predried, the dried product is treated with a suitable swelling agent, for example, one of those disclosed above, and then subjected to denitration.

According to the nature and intended use of the product, the nitrocellulose may be superficially, substantially or completely denitrated whereby the nitro groups are split off and the cellulose ester converted to cellulose hydrate. As the reaction proceeds, fresh quantities of the reducing agent may be continuously or intermittently added to the circulating bath so as to maintain the concentration of the reducing agent, and water may be added if desired to maintain the concentration of the polysulfide below an objectionable amount. After denitration has proceeded to the desired point, the product may be washed and soured with a dilute mineral acid, to remove any iron sulfide, after which the product may, if desired, be bleached, dyed, delustered, soaped, washed, dried and softened in a known manner.

It is to be understood that for obtaining uniform products one should maintain constant the concentration of the denitrating agent and of the polysulfide produced, the temperature, and the pH of the solution. It is also preferable, whether the process is a batch or continuous process, to maintain a definite ratio between the weight of cellulose nitrate and the amount of the reducing solution, for when this is done, a better control can be maintained over both the rate and extent of denitration.

By way of illustration, but not by way of limiting the invention, there may be given the following examples of the application of the present process.

1. A suitable tube-forming dope comprising nitrocellulose dissolved in a mixture of ether and ethyl alcohol is extruded through an annular orifice into a coagulating bath comprising water. The coagulated tubing is maintained in the wet and swollen gel state by reason of containing the residual alcohol and ether until it is passed continuously through the denitrating solution, which is maintained at a sodium sulfhydrate concentration of 1.9 by the continuous addition of small quantities of a 30 per cent aqueous solution of sodium sulfhydrate. The polysulfide content (calculated as $Na_2S$) is maintained at 3.4% by the continuous addition of water. The temperature is maintained at 15° C. and the pH of the solution is maintained between 11 and 11.5 by the continuous addition of a dilute solution of sulfuric acid. The speed of the casing and the total traverse through the bath is so adjusted as to produce a product containing about a .05 residual nitrogen and the remainder cellulose hydrate. The product is purified, softened, and dried in a known manner.

2. A suitable film-forming dope comprising nitrocellulose, a plasticizer and a solvent evaporated to form a self-supporting film. The film is stripped from the drum and passed continuously through a bath comprising a mixture of water and acetone of sufficient concentration to swell but not to dissolve the film. The film in the swollen gel state is then passed continuously through a denitrating bath comprising 2.75% sodium hydrosulfide and 1.05% sodium polysulfide, maintained at a temperature of 15° C., the traverse being sufficient to denitrate the film to the required extent. The pH is maintained at a value of 11 by adding sulfuric acid. The denitrated product is finished in a conventional manner.

3. A solution of nitrocellulose in a suitable solvent such, for example, as a mixture of ether and ethyl alcohol is extruded through a spinnerette into a coagulating bath containing water and a small proportion of ethyl alcohol the contact with the coagulating bath being sufficient to set up a definite micelle structure in the nitrocellulose product. The mixture of ethyl alcohol and water will maintain the product in the gel state. Thereafter, the artificial filaments are denitrated while in the swollen gel state by passing the filaments continuously through a bath comprising 3.75% sodium hydrosulfide, 1.75% sodium polysulfide and water at a temperature of 13° C., the denitrating solution being continuously circulated concurrently with the filaments. The pH is maintained at a value below 11.5 by the addition of ammonium sulfate to the bath. The denitrated filaments are washed, treated with hot dilute hydrochloric acid and thereafter finished in a known manner.

The process of the invention has many advantages over the processes heretofore known, in that the denitration can be carried out uniformly and continuously so that a homogeneous product is produced without danger of degrading the cellulose hydrate. Moreover, since the treatment is continuous one may produce filaments, films and tubing in a continuous and rapid manner while avoiding the degradation of the cellulose and without reducing the tensile strength of the products. What is more important, the products are characterized by exhibiting an unusually high tensile strength when wet, as well as a high tensile strength when dry. The wet tensile strength is further improved if the products are stretched after coagulation and before denitration. A further novel characteristic of the products is their extremely low shrinkage upon washing and drying, the shrinkage being less than 2%.

Various changes can be made in the process in the composition of the denitrating solution without transcending the scope of the invention, for example, when making filaments, the filaments may be subjected to various textile operations between the time of formation and the time of denitration such, for example as twisting, doubling, and winding into cakes and yarn packages.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. In a process for the denitration of an elongate article containing nitrocellulose, the steps comprising treating the article with an alkaline solution of an alkali hydrosulfide as a reducing agent, while maintaining the solution alkaline but below a pH of 12 during the treatment by adding a buffering agent to the solution.

2. In a process for the denitration of an elongate article containing nitrocellulose, the steps comprising treating the article with an alkaline solution of an alkali hydrosulfide as a reducing agent, while maintaining the solution alkaline but below a pH of 12 during the treatment by adding a salt of a weak base and a strong acid to the solution.

3. In a process for the denitration of an elongate article containing nitrocellulose, the steps comprising treating the article with an alkaline solution of an alkali hydrosulfide as a reducing agent, while maintaining the solution alkaline but below a pH of 12 during the treatment by adding an acid salt to the solution.

4. In a process for the denitration of an elongate article containing nitrocellulose, the steps comprising treating the article with an alkaline solution of an alkali hydrosulfide as a reducing agent, while maintaining the solution alkaline but below a pH of 12 during the treatment by adding an acid to the solution.

5. In a process for the denitration of an elongate article containing nitrocellulose, the steps comprising treating the article while in a swollen gel state with an alkaline solution of an alkali hydrosulfide as a reducing agent, while maintaining the solution alkaline but below a pH of 12 during the treatment by adding a buffering agent to the solution.

6. The process for denitrating filaments containing nitrocellulose which comprises continuously passing the article through an alkaline solution of an alkali hydrosulfide as a reducing agent, while maintaining the solution alkaline but below a pH of 12 during the treatment by adding a buffering agent to the solution.

7. The process for denitrating sausage tubings containing nitrocellulose which comprises continuously passing the article through an alkaline solution of an alkali hydrosulfide as a reducing agent, while maintaining the solution alkaline but below a pH of 12 during the treatment by adding a buffering agent to the solution.

FRANK H. REICHEL.
RALPH T. K. CORNWELL.

REFERENCES CITED

The following references are of record in the file of this patent:

UNITED STATES PATENTS

| Number | Name | Date |
|---|---|---|
| 1,722,171 | Bassett | July 23, 1929 |
| 2,091,969 | Dreyfus | Sept. 7, 1937 |
| 562,626 | Lehner | June 23, 1896 |
| 1,856,033 | Straub | Apr. 26, 1932 |
| 2,289,520 | Reichel et al. | July 14, 1942 |
| 301,024 | Weston | June 24, 1884 |
| 304,880 | Weston | Sept. 9, 1884 |

FOREIGN PATENTS

| Number | Country | Date |
|---|---|---|
| 309,377 | Great Britain | Oct. 8, 1930 |
| 798,853 | France | Mar. 11, 1936 |
| 139,442 | Germany | Feb. 23, 1903 |
| 139,899 | Germany | Mar. 11, 1903 |